United States Patent
Zhang et al.

(10) Patent No.: US 12,228,490 B2
(45) Date of Patent: Feb. 18, 2025

(54) SCREENING METHOD FOR SCREENING AN ADSORBENT FOR USE IN ENVIRONMENT-FRIENDLY GAS-INSULATED EQUIPMENT

(71) Applicants: HUBEI UNIVERSITY OF TECHNOLOGY, Wuhan (CN); GUANGXI POWER GRID CO., LTD., Nanning (CN)

(72) Inventors: Xiaoxing Zhang, Wuhan (CN); Shuangshuang Tian, Wuhan (CN); Yuandong Jiang, Nanning (CN); Dajian Li, Nanning (CN); Wei Zhang, Nanning (CN); Xiajin Rao, Nanning (CN); Fangyuan Han, Nanning (CN)

(73) Assignees: HUBEI UNIVERSITY OF TECHNOLOGY, Wuhan (CN); GUANGXI POWER GRID CO., LTD., Nanning (CN)

( * ) Notice: Subject to any disclaimer, the term of this patent is extended or adjusted under 35 U.S.C. 154(b) by 281 days.

(21) Appl. No.: 17/901,841

(22) Filed: Sep. 1, 2022

(65) Prior Publication Data
US 2023/0081241 A1 Mar. 16, 2023

(30) Foreign Application Priority Data
Sep. 9, 2021 (CN) .......................... 2021110573527

(51) Int. Cl.
*G01N 15/08* (2006.01)
*G01N 5/02* (2006.01)

(52) U.S. Cl.
CPC ... *G01N 15/088* (2013.01); *G01N 2015/0866* (2013.01)

(58) Field of Classification Search
CPC ............ G01N 5/00; G01N 5/02; G01N 15/00; G01N 15/08; G01N 15/088; G01N 2015/0866
See application file for complete search history.

(56) References Cited

FOREIGN PATENT DOCUMENTS

CN 108469481 A * 8/2018 ............ G01N 30/02

OTHER PUBLICATIONS

Machine Translation of CN-1018469481-A (Year: 2018).*

* cited by examiner

*Primary Examiner* — Nguyen Q. Ha (57) ABSTRACT

Disclosed is a screening method for selecting an adsorbent for use in environment-friendly gas-insulated equipment which contains an environment-friendly gas functioning as an insulating medium inside the equipment, the adsorbent to adsorb unwanted decomposed gas that is produced from decomposition of the environmental-friendly gas, the method steps include: establishing screening sets, performing pre-experiment adsorption experiment screening, standard gas adsorption experiment screening, and mixed gas adsorption experiment screening, establishing mapping relationship between a decomposed gas type set and a third adsorbent type set under different working conditions, and selecting an adsorbent combination mode suitable for a working condition type and a mixed gas composition mode based on the mapping relationship. Through adsorption experiment screening of a single standard gas and a mixed gas under different working conditions, an adsorbent combination mode suitable for adsorbing mixed decomposed gas under different working conditions is obtained.

7 Claims, 4 Drawing Sheets

SCREENING METHOD FOR SCREENING AN ADSORBENT FOR USE IN ENVIRONMENT-FRIENDLY GAS-INSULATED EQUIPMENT

FIELD OF THE DISCLOSURE

The disclosure relates to the technical field of electrical equipment, in particular to screening method for adsorbent in environment-friendly gas-insulated equipment.

BACKGROUND

At present, because $SF_6$ has a high Global Warming Potential value, its long-term use in gas-insulated switchgear will cause serious greenhouse effect and environmental pollution. the main solution is to use environmentally friendly insulating gas as an alternative to $SF_6$ in gas-insulated equipment. Specifically, environmentally friendly insulating gases (such as $C_4F_7N$, and $C_5F_{12}O$, $C_6F_{12}O$) and buffer gases (such as $CO_2$ and $N_2$) are mixed in a certain proportion and used in practical projects. However, some decomposition product will be produced under long-term working conditions, and some of them have certain toxicity, so it is necessary to use suitable adsorbents to adsorb these products in the equipment. The selected adsorbents should not only have strong adsorption performance for the decomposition products, but also cannot affect the concentration of the main insulating gas components.

Commonly used adsorption materials include porous metal oxides, carbonaceous materials, molecular sieves, metal organic framework materials, and covalent organic framework materials, which usually have porous structures with large specific surface area. Some materials contain multiple active sites and have strong adsorption properties for polar gas molecules. It is necessary to carry out adsorption experiments to screen out suitable materials from a large number of adsorption materials for use in gas-insulated equipment. The experiments studying the adsorption performance of materials are usually carried out by controlling a single variable: The gas pressure, temperature, and adsorption amount are kept constant, the adsorption isotherms, adsorption isobars, and adsorption isotherms are obtained to evaluate the adsorption properties of the materials.

The types of decomposition products of environmental-friendly insulating gas under different working conditions are complex. In the study of the adsorption performance of different adsorption materials on different adsorbate gases, the expense is high to use conventional research schemes. In addition, some porous materials have no concrete structures and their specifications do not meet the experimental requirements. The experiment has certain limitations. It is difficult to clarify the influence of the microstructure of the material on the gas adsorption performance from the macroscopic level. The selection of adsorption materials lacks theoretical basis and guidance, and ultimately leads to the low efficiency of the transformation of research results. Therefore, it is necessary to develop an efficient and reasonable research method to explore the adsorption properties of materials, and to provide technical guidance for the selection of adsorbents in gas-insulated equipment.

SUMMARY

The purpose of this disclosure is to provide a screening method for adsorbent in environment-friendly insulated equipment The method is used to solve the problem that the single-variable experimental method in the prior art is difficult to screen out suitable adsorbents for different working conditions.

This disclosure provides a screening method for adsorbent in environment-friendly gas-insulated equipment, comprising the following steps:

(1) Establishing screening sets: decomposed gas type sets under different working conditions and an original adsorbent type set are established.

(2) Pre-experiment screening: each adsorbent in the original adsorbent type set is selected to adsorb the standard gas of each decomposed gas in the decomposed gas type set under different working conditions, respectively. According to the mass change of the adsorbent before and after the adsorption, the suitable adsorbent is screened out for each of the standard gases, and a first adsorbent type set is established. The standard gas is a single component gas, which corresponds to a certain decomposed gas in the decomposed gas type set under different operating conditions.

(3) Standard gas adsorption experiments screening: each adsorbent in the first adsorbent type set is selected to adsorb the standard gas corresponding to each decomposed gas in the decomposed gas type set under different working conditions; according to the change of gas concentration before and after adsorption, the suitable adsorbent is screened out for each of the standard gas, and a second adsorbent type set is established.

(4) Mixed gas adsorption experiments screening: each adsorbent in the second adsorbent type set is selected to adsorb mixed decomposed gases in the decomposed gas type set under different working conditions, respectively; according to concentration changes of main insulating gas and the mixed decomposed gas before and after adsorption, the suitable adsorbent is screened out for the mixed decomposed gas under each working condition, and a third adsorbent type set is established; wherein the main insulating gas is a gas component other than the decomposed gas in the mixed atmosphere.

(5) Establishing mapping relationship between the decomposed gas type set and the third adsorbent type set under different working conditions. Based on the mapping relationship, the combination of adsorbents suitable for the type of working conditions and the composition of the mixed gas is selected; the mapping relationship is specifically the correspondence between the working condition type, the composition mode of the mixed gas, and the composition mode of the adsorbent.

(6) if there is no corresponding adsorbent combination under a certain working condition type and mixed gas composition according to the mapping relationship, based on the molecular dynamics theory. the structure of the simulated adsorbent is constructed, the results of the three adsorption experiments in steps (2), (3), and (4) are combined, the adsorbent combination suitable for the simulated adsorbent structure is selected.

The beneficial effects of this disclosure include: this disclosure provides a screening method for adsorbent in environment-friendly gas-insulated equipment. Through adsorption experiments of a single standard gas and a mixed gas under different working conditions, an adsorbent combination mode suitable for adsorbing mixed decomposed gas under different working conditions is obtained; at the same time, in view of the situation that the suitable adsorbent has not been screened through the adsorption experiment, the suitable adsorbent is further screened with the molecular dynamics theory, so that all the adsorbent combinations suitable for different working conditions can be obtained.

This method provides a basis for the selection of adsorbents under different working conditions.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

Figure 1:
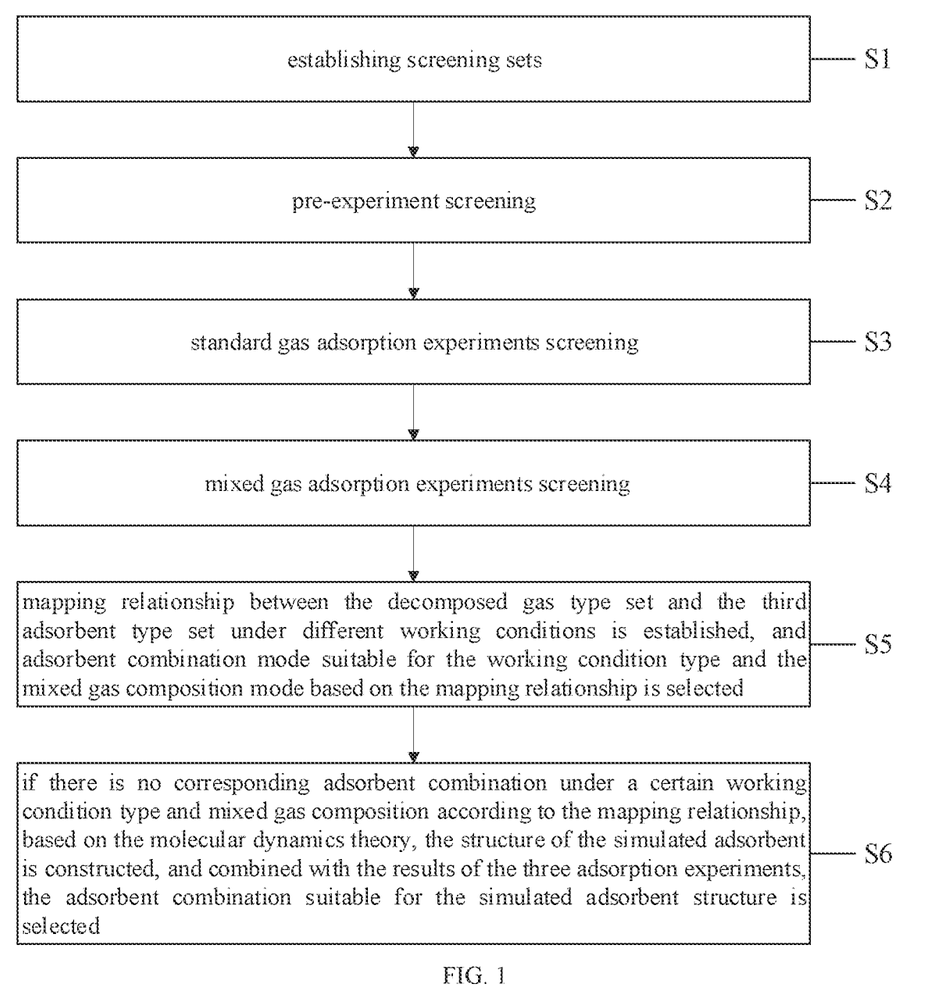
FIG. 1 is the flow chart of an embodiment of the screening method for adsorbent in environment-friendly gas-insulated equipment in this disclosure.

Please refer to FIG. 1, FIG. 1 is the flow chart of an embodiment of the screening method for adsorbent in environment-friendly gas-insulated equipment in this disclosure, the screening method comprises the following steps:

S1, Establishing screening sets: decomposed gas type sets under different working conditions and an original adsorbent, type set are established.

S2, Pre-experiment screening: each adsorbent in the original adsorbent type set is selected to adsorb the standard gas corresponding to each decomposed gas in the decomposed gas type set under different working conditions, respectively; according to the mass change of the adsorbent before and after the adsorption, the suitable adsorbent for each of the standard gases is screened out, and a first adsorbent type set is established.

S3, Standard gas adsorption experiments screening: each adsorbent in the first adsorbent type set is selected to adsorb the standard gas corresponding to each decomposed gas in the decomposed gas type set under different working conditions; according to the change of gas concentration before and after adsorption, the suitable adsorbent for each of the standard gas is screened out, and a second adsorbent type set is established.

S4, Mixed gas adsorption experiments screening: each adsorbent in the second adsorbent type set is selected to adsorb mixed decomposed gases in different working conditions in the decomposed gas type set under different working conditions, respectively; according to concentration changes of main insulating gas and the mixed decomposed gas before and after adsorption, the suitable adsorbent for the mixed decomposed gas under each working condition is screened out, and a third adsorbent type set is established.

S5, The mapping relationship between the decomposed gas type set and the third adsorbent type set under different working conditions is established. And based on the mapping relationship, an adsorbent combination mode suitable for the working condition type and the mixed gas composition is selected.

S6, If there is no corresponding adsorbent combination under a certain working condition type and mixed gas composition according to the mapping relationship, based on the molecular dynamics theory, the structure of the simulated adsorbent is constructed, and the results of the three adsorption experiments in steps S2, S3, and S4 are combined, the adsorbent combination suitable for the simulated adsorbent structure is selected.

The following describes the screening method for adsorbent in gas-insulated equipment through specific embodiments.

Embodiment 1

Figure 2:
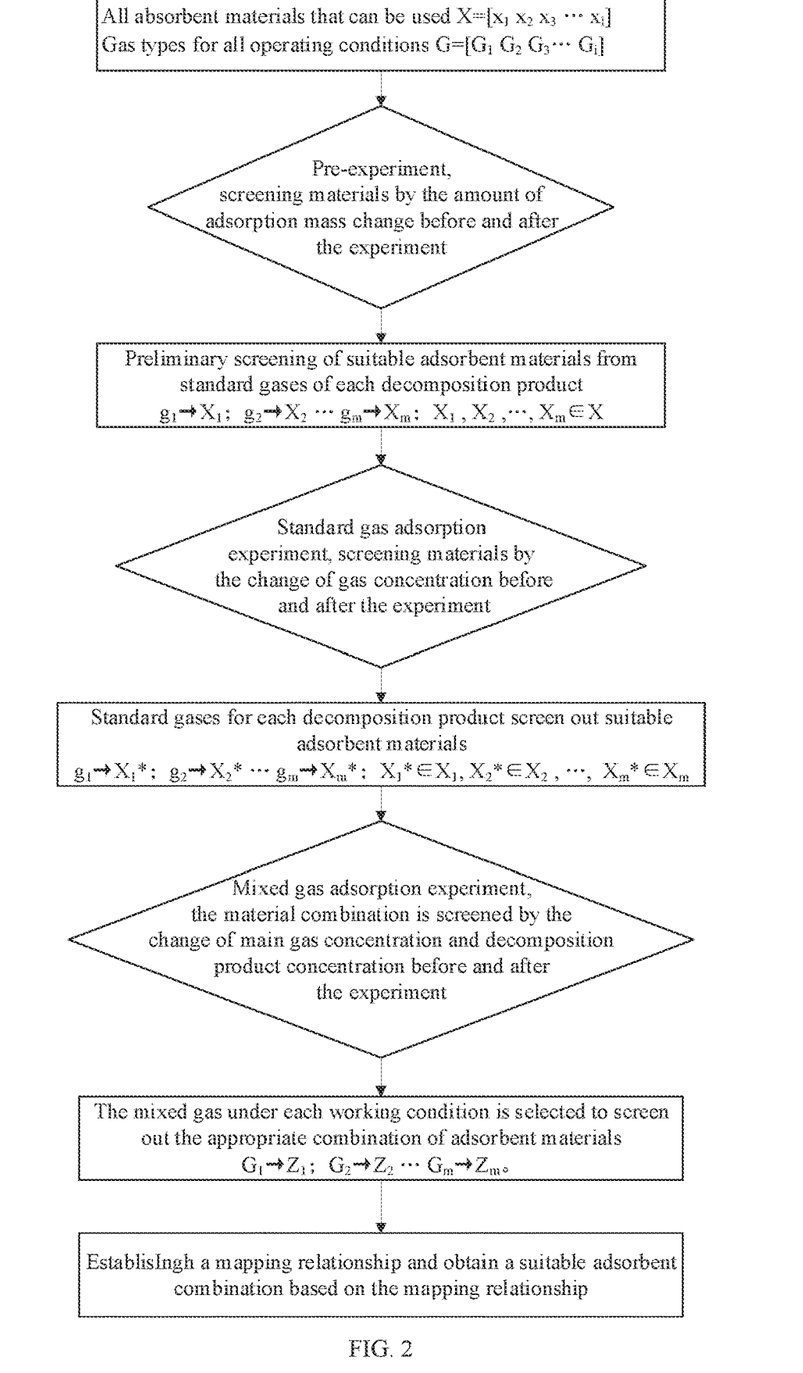
FIG. 2 is the flow chart of screening method in Embodiment 1 of this disclosure.

Please refer to FIG. 2, FIG. 2 is the flow chart of screening method in Embodiment 1 of this disclosure. Embodiment 1 mainly illustrates that after step S5 of the screening method for adsorbent in environment-friendly gas-insulated equipment, there is a corresponding adsorbent combination mode under a certain working condition type and mixed gas composition mode, that is, this embodiment describes the situation that screening result of the adsorbent can be obtained directly from steps S1 to S5, the specific steps are as follows:

(1) Establishing Screening Sets

Specifically, decomposed gas type sets under different working conditions are established and defined as set $G_i$, $G_i=[g_{i1}\ g_{i2}\ g_{i3}\ \ldots\ g_{im}]$. Each element in the set $G_i$ corresponds to a decomposition gas, and represents the m-th type of decomposition gas under the i-th type of working condition. The original adsorbent type set is all available adsorbent material types, and is defined as a set X, $X=[x_1\ x_2\ x_3\ \ldots\ x_l]$. Each element $x_1$ in the set X corresponds to a type of adsorbent material, and there are l types in total, wherein i, m, and l are all integers greater than or equal to 1, and l≥m, it should be ensured that each decomposed gas has at least one adsorbent capable of adsorbing it.

(2) Pre-Experiment Screening

The main content of pre-experiment screening is to make a preliminary judgment to the adsorption performance of all existing adsorbent materials by the increase of adsorbent mass before and after the experiment, a set of pre-experiments shall be carried out for each standard gas corresponding to the decomposition product of environmentally friendly insulating gas. The standard gas is single-component gas under the standard working conditions corresponding to a certain decomposed gas in the decomposed gas type set under different working conditions. Since there are m types of decomposed gases in the decomposed gas type set $G_i$ under different working conditions, m groups of pre experiments need to be carried out. In each set of pre-experiments, the first adsorbent type set $X_m$ is formed by screening the first adsorbent type set $X_m$ from the set X, where the set $X_m$ belongs to the set X.

Figure 4:
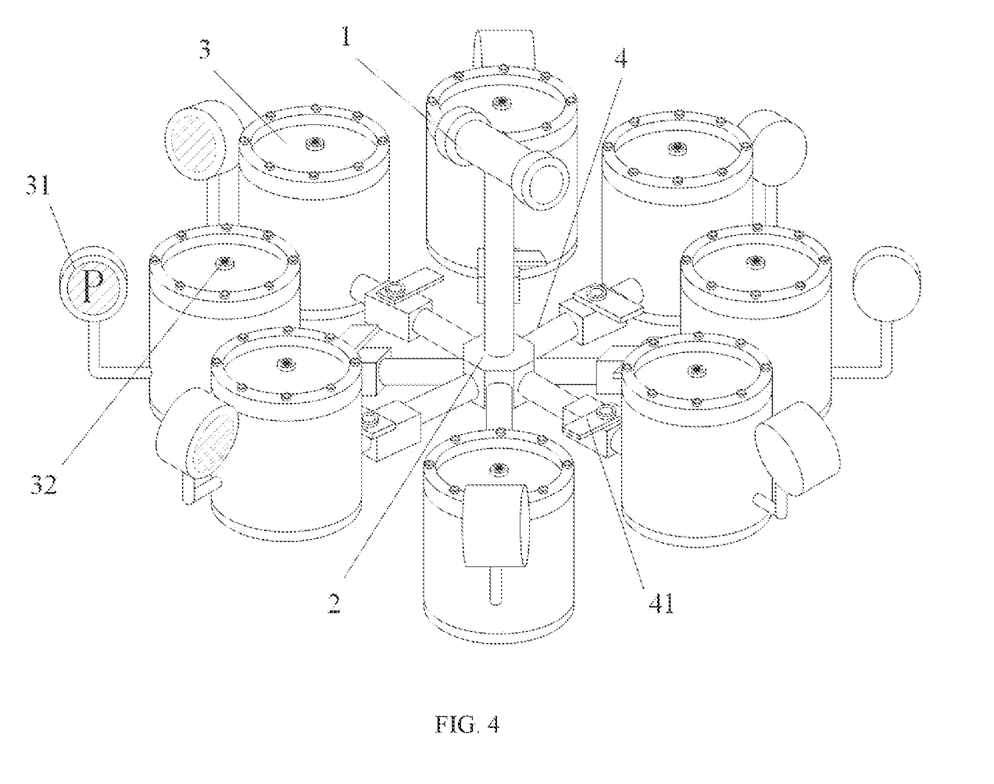
FIG. 4 is the structure of an embodiment of adsorption device in this disclosure.

The adsorption device adopted in the experiment is shown in FIG. 4, The adsorption device includes an intake pipe 1, an adapter 2, a plurality of gas chambers 3 and a plurality of guide pipes 4; the adapter 2 is a hollow polygonal prism-shaped structure, the top of the adapter 2 is communicated with the intake pipe 1, and the side surface of the adapter 2 is communicated with a plurality of guide pipes 4, one end of each guide pipe 4 away from the adapter 2 is communicated with the same gas chamber 3, and the gas chamber 3 has a closed cavity for accommodating the gas to be measured, and the inner cavity of each gas chamber 3 is correspondingly connected to a barometer 31 for observing the inner cavity pressure;

The top of gas chamber 3 is also provided with micro water sampling hole 32, the micro water sampling hole is filled with a small amount of water by using a sample needle, which the adsorption performance of the adsorbent to the micro-water can be analyzed; the inlet pipe 1 has a T-shaped structure at one end away from the adapter 2, and has two through holes, one of which is a vacuum pump interface, which is used to connect with the vacuum pump and vacuumize each gas chamber 3. At the same time, it can also absorb the remaining gas impurities in the gas chamber 3, and the other is an inlet hole for introducing gas into each gas chamber 3; each guide pipe 4 is provided with an inlet valve 41 for controlling the flow rate of the gas to be measured entering the gas chamber 3; a plurality of gas chambers 3 can realize simultaneous testing of a variety of adsorbents. In this embodiment, there are 8 gas chambers. In other embodiments, the number and size of the gas chambers 3 can be adaptively set according to the number and quality of adsorbent types to be measured, which are not limited here. Since subsequent adsorption experiments are performed using the adsorption device, the structure of the adsorption device will not be described in detail in the following text.

Before the experiment, using absolute ethanol to wipe the inner wall of the gas chamber of each adsorption device. After air-drying, putting the adsorbent materials that can be used in the experiment with approximately the same mass into several gas chambers (for example, the mass of each adsorbent material put in is 1.0 g, and the mass error between adsorbent materials does not exceed ±0.1 g). Then sealing the gas chambers to check the tightness of the device, vacuuming the gas chamber, if the pressure indicator does not change after standing for 24 hours, it means that the tightness is good, otherwise, the gas chamber needs to be checked for gas leakage.

After tightness inspection of the device is completed, the adsorbent material needs to be desorbed. The gas tank containing the adsorbent is evacuated and placed in a 40° C. temperature control box for 24 hours. Then using a vacuum pump to vacuumize the gas tank. The main purpose of this step is to remove trace gas impurities remaining in the adsorbent material, so as not to affect the results of subsequent adsorption experiments. A sufficient amount of standard gas corresponding to the decomposed gas is added to the pressure indicating number of 0.3 MPa, and the adsorbents are allowed to adsorb naturally for 36 hours.

After the adsorption is completed, extracting the excess gas in the gas chamber, opening the gas chamber, and using an analytical balance to measure the mass of various adsorbent materials after the experiment. The mass of the adsorbed gas can be calculated from the mass of the adsorbent before and after the experiment, that is, the mass change of the adsorbent $\Delta m = m_2 - m_1$, where $m_1$ is the mass of the adsorbent before the adsorption experiment, and $m_2$ is the mass of the adsorbent after the adsorption experiment. When $$\frac{\Delta m}{m_1} \geq 10\%,$$

it is considered that the selected adsorbent may have better adsorption performance for the standard gas in the preliminary experiment, and the adsorbent that meets the conditions is selected and included in the first adsorbent type set $X_m$.

TABLE 1

Screening results of adsorbents corresponding to decomposed gases under different working conditions in pre-experiment screening

| Standard gas | Types of decomposition product gases under i types of working conditions | | | | | Collections of adsorbents for pre-experimental screening |
|---|---|---|---|---|---|---|
| | $G_1$ | $G_2$ | $G_3$ | ... | $G_i$ | |
| $g_1$ | $g_{11}$ | ... | ... | ... | ... | $X_1$ |
| $g_2$ | $g_{12}$ | ... | ... | ... | ... | $X_2$ |
| ... | ... | ... | ... | ... | ... | ... |
| $g_j$ | $g_{1j}$ | ... | ... | ... | ... | $X_j$ |
| $g_{j+1}$ | — | $g_{2(j+1)}$ | ... | ... | ... | $X_{j+1}$ |
| $g_{j+2}$ | — | $g_{2(j+2)}$ | ... | ... | ... | $X_{j+2}$ |
| ... | — | ... | ... | ... | ... | ... |
| $g_k$ | — | $g_{2k}$ | ... | ... | ... | $X_k$ |
| $g_{k+1}$ | — | — | $g_{3(k+1)}$ | ... | ... | $X_{k+1}$ |
| $g_{k+2}$ | — | — | $g_{3(k+2)}$ | ... | ... | $X_{k+2}$ |
| ... | — | — | ... | ... | ... | ... |
| $g_l$ | — | — | $g_{3l}$ | ... | ... | $X_l$ |
| ... | — | — | — | ... | ... | ... |
| $g_{n+1}$ | — | — | — | — | $g_{i(n+1)}$ | $X_{n+1}$ |
| $g_{n+2}$ | — | — | — | — | $g_{i(n+2)}$ | $X_{n+2}$ |
| ... | — | — | — | — | ... | ... |
| $g_m$ | — | — | — | — | $g_{im}$ | $X_m$ |

Table 1 shows the screening results of the adsorbents corresponding to the decomposed gases under different working conditions in the pre-experiment. There are certain differences in the types of decomposition product gases under different working conditions, and some of the decomposition product gases may exist simultaneously in various types of working conditions. Table 1 lists the existence of the main decomposition product gases and the corresponding adsorbent selection under all types of working conditions, where "—" indicates that there is no corresponding adsorbate gas under the i-th type of working condition. The adsorbent materials screened in the pre-experiment are incorporated into the first adsorbent type set $X_m$, where $X_1$, $X_2 \ldots X_m$ are all subsets of the set X, the adsorbent materials that meet the conditions are screened from the set X to form a new set $X_m$, the adsorbents in the first adsorbent type set $X_m$ have better adsorption performance for the standard gas $g_m$ corresponding to the decomposed gas.

(3) Standard Gas Adsorption Experiments Screening

During the standard gas adsorption experiment, the adsorption performance of the adsorbents in the set $X_i$ to the standard gas $g_i$ is evaluated by concentration reduction of standard gas $g_i$ before and after the experiment. Putting the elements in the first adsorbent type set $X_m$, $[x_{m1} \, x_{m2} \ldots x_{mk}]$. Referring to the specification for the use of adsorbents for sulfur hexafluoride electrical equipment, the k types of adsorbents preliminarily screened through the pre-experiment are put into the adsorption device, and then the experiment of this step is carried out according to the method similar to the previous pre-experiment screening. The adsorbent mass is 10% of the gas mass, combining the use of the volume of the gas chamber and the pressure of the charged gas, the mass of the adsorbent put in is set to be about 2.3 g. According to the actual operating environment of the gas-insulated equipment, the standard gas of the decomposition product is filled into the gas tank to a relative pressure of 0.2 MPa, and the adsorbent is allowed to adsorb naturally for 36 hours.

After the adsorption is completed, the standard gas is collected by using a gas collection bag, and the concentration of the gas after the adsorption experiment is measured by gas chromatography-mass spectrometer and Fourier transform infrared spectrometer respectively. At the same time, the standard gas before the experiment is collected, and the concentration of the standard gas is measured by the above two instruments. The concentration of the adsorbed gas $\Delta C_1$-$C_2$ is calculated by the difference between the concentration of the standard gas $g_m$ before and after the experiment, where $C_1$ is the concentration of standard gas $g_m$ in the gas chamber before the experiment, $C_2$ is the concentration of standard gas $g_m$ in the gas chamber after the experiment, $\Delta C$ is the change in the concentration of standard gas in the gas chamber before and after the experiment. When $$\frac{\Delta C}{C_1} \geq 50\%,$$

it is considered that the selected adsorbent $x_{mi}$ (i=1, 2, 3 . . . k) has good adsorption performance for the standard gas $g_m$ in the experiment, and the adsorbent $x_{mi}$ has the potential to be used in mixed gases. The adsorbents that meet the conditions are formed into a new second adsorbent type set $X^*_m$ and the second adsorbent type set $X^*_m$ screened out by standard gas adsorption experiments are all subsets of the first adsorbent type set Xm above. That is, adsorbents with excellent adsorption performance are more accurately selected from the initially screened collection of adsorption materials to form a new collection. The screened second adsorbent type set $X^*_m$ is used for the next mixed gas adsorption experiment.

(4) Mixed Gas Adsorption Experiments Screening

During the mixed gas adsorption experiment, the adsorption performance of the adsorbent on the mixed decomposed gas under various actual working conditions is further explored through the mixed gas adsorption experiment, and the influence of the selected adsorbent on the concentration of the main gas components is also explored. The mixed gas under each working condition is subjected to a set of mixed gas adsorption experiments, and the appropriate combination of adsorbent materials is screened. There are i types of working conditions, so i groups of mixed gas adsorption experiments are required.

Specifically, it is assumed that there are four types of decomposition product gases that need to be adsorbed under one working condition, namely set $G_i$=[$g_1$ $g_2$ $g_3$ $g_4$], and the adsorbents with excellent adsorption performance of each decomposition product are shown in Table 2.

TABLE 2

Adsorbents corresponding to each standard gas

| Standard gas | Collection of adsorbent materials with better adsorption performance |
| --- | --- |
| $g_1$ | $X_1^* = [x_{11}\ x_{12}\ \ldots\ x_{1k}]$ |
| $g_2$ | $X_2^* = [x_{21}\ x_{22}\ \ldots\ x_{2l}]$ |
| $g_3$ | $X_3^* = [x_{31}\ x_{32}\ \ldots\ x_{3m}]$ |
| $g_4$ | $X_4^* = [x_{41}\ x_{42}\ \ldots\ x_{4n}]$ |

In the mixed gas adsorption experiment, further screening is carried out based on the second adsorbent type set $X^*_m$, the adsorbent corresponding to the standard gas has good adsorption performance. Selecting an adsorbent suitable for the standard gas from each second adsorbent type set $X^*_m$ and combining them. The adsorbents in the second adsorbent type set $X^*_m$ cannot be selected repeatedly. The combinations are: $x_{11}x_{21}x_{31}x_{41}$, $x_{12}x_{21}x_{31}x_{41}$, $x_{1k}x_{2l}x_{3l}x_{41}$, . . . , $x_{1k}x_{2l}x_{3m}x_{4n}$. The mass of the selected adsorbent is set according to the ratio of the standard gas g, concentration. For example, when $x_{11}$ type adsorbent is selected for combination, the added mass calculation formula is $$M_{x_{11}} = \frac{C_{g_1}}{C_{g_1} + C_{g_2} + C_{g_3} + C_{g_4}} \times 2.3\ g,$$

where $C_{gi}$ is the concentration of the decomposition product gas $g_i$ in the mixed gas, and 2.3 g is the total mass of the added adsorbent. According to the adsorption material sets corresponding to various adsorbate gases in Table 2, the types of combinations are at most k×l×m×n. Of course, there is also the possibility that a adsorbent has good adsorption performance for multiple decomposition product gases, and the combination method may be repeated, so that the possible combination types are less than or equal to k×l×m×n. This adsorbent can be defined as a multifaceted adsorbent. When the mass of the multifaceted adsorbent is calculated, you can first calculate the mass of the multifaceted adsorbent required in each single decomposition product gas according to the above formula, then add the calculated mass, the result is the final mass of the multifaceted adsorbent.

Then, putting the above-mentioned different combinations of adsorbent materials into the adsorption device, using the equipment in step (3) to measure the concentration of the main insulating gas and the decomposition gases of g1, g2, g3, and g4 before and after the experiment, the main insulating gas is a gas component other than the decomposition gas in the mixed gases, and the main insulating gas does not undergo the process of product decomposition, $C_{1x}$ is the concentration of main insulating gas components before the experiment (x is $C_4F_7N$, $C_5F_{10}O$, $C_{2x}$ is the concentration of main insulating gas components after the experiment, $C_{1y}$ is the decomposition gas concentration before the experiment (y=g1, g2, g3, and g4), and $C_{2y}$ is the decomposition gas concentration after the experiment.

If the concentration of each gas in the gas chamber of one or more adsorbents before and after the experiment satisfies the following conditions:

$$99.9\% \leq \frac{C_{2x}}{C_{1x}} \leq 100\%,\ \frac{C_{1y} - C_{2y}}{C_{1y}} \geq 50\%,$$

it is considered that the effect of the adsorbent combination on the concentration of the main insulating gas components can be ignored, the adsorption performance of the decomposition product gas is good, and it has a certain practical application prospect in the gas-insulated switchgear. Mixed gases under other types of working conditions are also subjected to mixed gas adsorption experiments in the above manner, and the appropriate combination of adsorbent materials is found through the established standards. A variety of suitable adsorption combinations constitute the third adsorbent type set Z, Z=[$z_1$ $z_2$ . . . $z_m$], that is, the combination of adsorbents with better adsorption performance of mixed gas Gi under the i-type condition is Z=[$z_{i1}$ $z_{i2}$ . . . $z_{im}$], there are m suitable combination types that can be applied in practical projects.

(5) Establishing the mapping relationship between the decomposed gas type set $G_i$ and the third adsorbent type set Z under different working conditions, and selecting the suitable adsorbent combination mode based on the mapping relationship with the working condition type and the mixed gas composition. Among them, the established mapping relationship is specifically the correspondence between the working condition type, the composition of the mixed gas, and the composition of the adsorbent. That is, after knowing the type of working condition and the composition of the mixed gas, it is possible to obtain the suitable combination of adsorbents according to the established mapping relationship, so as to complete the screening of adsorbents.

Embodiment 2

Figure 3:
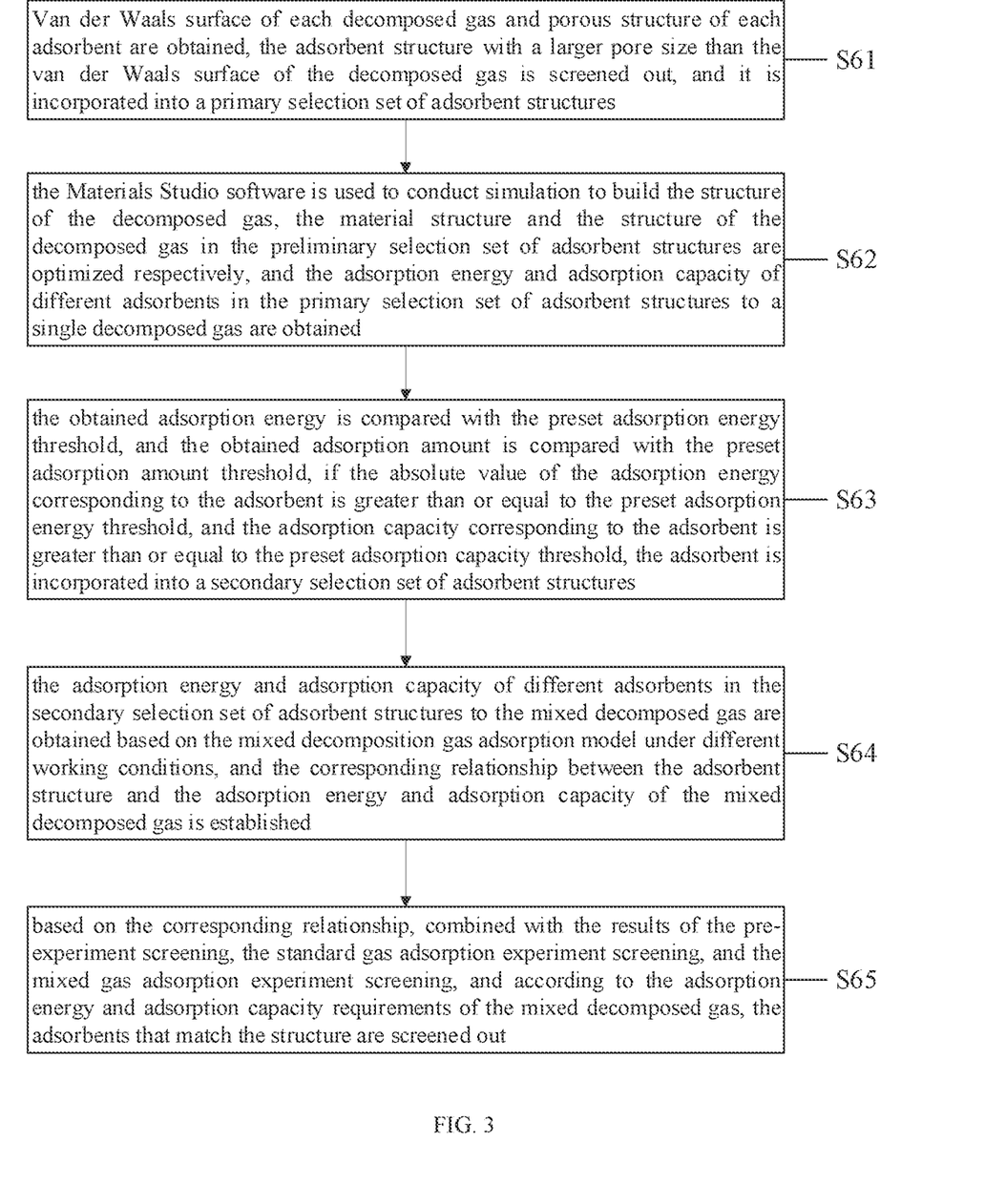
FIG. 3 is the flow chart of screening method in Embodiment 2 of this disclosure.

Please refer to FIG. 3, FIG. 3 is the flow chart of the screening method in the Embodiment 2 of this disclosure, Embodiment 2 mainly describes that after step S5 of the screening method for adsorbent in environment-friendly gas-insulated equipment, there is no corresponding adsorbent combination under a certain working condition type and mixed gas composition mode, this embodiment describes is that the adsorbent screening results cannot be obtained directly from steps S1 to S5, and the screening needs to be carried out according to molecular dynamics theory. The specific steps are as follows:

S61, Van der Waals surface of each decomposed gas and porous structure of each adsorbent are obtained, the adsorbent structure with a larger pore size than the van der Waals surface of the decomposed gas is screened out, and it is incorporated into a primary selection set of adsorbent structures;

Since the adsorbent is often porous and has a high specific area, the theoretical analysis of adsorbents can be carried out based on the structural characteristics. In this step, the van der Waals surface of each decomposed gas is first counted by referring to literature, then the structure of all porous materials is counted, and the adsorbent material structure with a pore size larger than that of the van der Waals surface of the adsorbate gas is screened for the next simulation calculation.

S62, the Materials studio software is used to conduct simulation experiments to build the structure of the decomposed gas, the adsorbent structures in the preliminary selection set and the structure of the decomposed gas are optimized respectively, the adsorption energy and adsorption capacity of different adsorbents in the primary selection set of adsorbent structures to a single decomposed gas are obtained;

In this step, the Materials studio software is used for simulation experiments. The simulation mainly uses the Adsorption and Sorption modules. Before the simulation, the Dmol3 module is used to optimize the structure and geometry of the various adsorbate gases. The material structures of the adsorbents in the preliminary set of adsorbent structures from the crystal database are imported into the Materials studio software, and the imported structures are geometrically optimized by using the Forcite module. Then, the adsorbent material structure and gas structure after the optimization are used to build the gas-solid adsorption model by using the Adsorption module and the Sorption module, respectively. The temperature is set to normal and the force field is Dreiding. The adsorption energy (kcal/mol) and adsorption capacity (pieces/unit cell) of different adsorbents in the primary selection set of adsorbent structures to a single decomposed gas in the above two modules are calculated respectively; Among them, the calculation formula of adsorption energy is $E_{adsorption}=E_{(molecular\ sieve+gas\ system)}-E_{molecular\ sieve}-E_{gas}$, that is, the total energy of the system after adsorption minus the sum of the energy of each system before adsorption is the adsorption energy; the calculation formula of the experimental adsorption capacity is: $N_{experiment}=N_{theoretical}-N_A PV_{pore}/RT$ ($V_{pore}=V_{unit\ cell}*Porosity$), and $N_{theoretical}$ is the calculated value of molecular dynamics theory.

S63, the obtained adsorption energy is compared with the preset adsorption energy threshold, and the obtained adsorption amount is compared with the preset adsorption amount threshold, if the absolute value of the adsorption energy corresponding to the adsorbent is greater than or equal to the preset adsorption energy threshold, and the adsorption capacity corresponding to the adsorbent is greater than or equal to the preset adsorption capacity threshold, the adsorbent is incorporated into a secondary selection set of adsorbent structures;

In this embodiment, the preset adsorption energy threshold is set to 100 kcal/mol, and the preset adsorption capacity threshold is 20 cells/unit cell; when the absolute value of adsorption energy is higher than 100 kcal/enol, it is considered that the adsorbent material structure has good adsorption performance for gas. When the theoretical adsorption capacity is not less than 20 cells/unit cell, it is considered that the adsorbent material structure has a good storage capacity for gas. When the above two conditions are met, the adsorbent is incorporated in the secondary selection set of adsorbent structures, and the simulation calculation of the mixed gas is carried out in the next step.

S64, the Materials studio software is used to simulate and the mixed decomposition gas adsorption model under different working conditions is established, the adsorption energy and adsorption capacity of different adsorbents in the secondary selection set of adsorbent structures to the mixed decomposed gas are obtained, and the corresponding relationship between the adsorbent structure and the adsorption energy and adsorption capacity of the mixed decomposed gas is established;

In this step, according to the actual concentration of the mixed gas under different working conditions, the mixed gas models of different proportions are set, then the same calculation on the mixed gas is performed according to the above single gas calculation steps to obtain the corresponding adsorption energy and adsorption capacity, and further the corresponding relationship between the adsorbent structure and the adsorption energy and adsorption capacity of the mixed decomposed gas is established.

S65, Based on the corresponding relationship, combined with the results of the preexperiment screening, the standard gas adsorption experiment screening, and the mixed gas adsorption experiment screening, and according to the adsorption energy and adsorption capacity requirements of the mixed decomposed gas, the adsorbents that match the structure are screened out.

In this step, based on the above correspondence, the results of the three adsorption experiments in steps S2 to S4 are combined, and the calculation results of molecular dynamics theory, the influence of the microscopic configuration of the adsorption material on the gas adsorption capacity can be clarified. Under a certain working condition, the demand for the adsorption energy and adsorption capacity of the mixed decomposed gas is certain. Due to the corresponding relationship between the adsorbent structure and the adsorption energy and adsorption capacity of the mixed decomposed gas, the corresponding adsorbent structure at this time is also certain. Through the matching operation of the corresponding adsorbent structure, the desired single adsorbent or multi-adsorbent combination can be obtained. Of course, under the premise of knowing the structural requirements of the adsorbent, it is also possible to guide the artificial synthesis of the desired target structure of the adsorbent to achieve high-efficiency productization, which will not be further discussed.

This disclosure provides a screening method for adsorbent in environment-friendly gas-insulated equipment. Through adsorption experiments of a single standard gas and a mixed gas under different working conditions, an adsorbent combination mode suitable for adsorbing mixed decomposed gas under different working conditions is obtained; at the same time, in view of the situation that the suitable adsorbent has not been screened through the adsorption experiment, the suitable adsorbent is further screened with the molecular dynamics theory, so that all the adsorbent combinations suitable for different working conditions can be obtained. This method provides a basis for the selection of adsorbents under different working conditions.

It should be noted that the above embodiments all belong to the same inventive concept, the description of each embodiment has its own emphasis, and the descriptions in the individual embodiments are not detailed, and it can refer to the descriptions in other embodiments.

However, it is to be understood that even though numerous characteristics and advantages of this disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A screening method for selecting an adsorbent for use in environment-friendly gas-insulated equipment, comprising the following steps:
   (1) establishing screening sets: establishing a decomposed gas type set comprising a plurality of unwanted decomposed gases produced from decomposition of an insulating gas inside the equipment operating under different operating conditions, and an original adsorbent type set comprising a plurality of adsorbents that potentially capable of adsorbing the unwanted decomposed gases;
   (2) performing pre-experiment adsorption experiment screening: selecting each of the adsorbents in the original adsorbent type set to adsorb each of standard gases corresponding to each of the decomposed gases in the decomposed gas type set; then according to a change in mass of the adsorbent before and after the adsorption, a first suitable adsorbent for each of the standard gases is screened out and selected to establish a first adsorbent type set; the standard gases are one of single-component decomposed gases produced under a standard operating condition of the equipment, and plural-component decomposed gases produced under different operating conditions of the equipment;
   (3) performing standard gas adsorption experiment screening: selecting each of the adsorbents in the first adsorbent type set to adsorb each of the standard gases corresponding to each of the decomposed gases in the decomposed gas type set; then according to a change in concentration of the decomposed gas before and after adsorption, a second suitable adsorbent for each of the standard gases is screened out and selected to establish a second adsorbent type set;
   (4) performing mixed gas adsorption experiment screening: selecting each of the adsorbents in the second adsorbent type set to adsorb each of standard gases corresponding to the plural-component decomposed gases, or a mixed decomposed gas composition, produced under different operating conditions of the equipment in the decomposed gas type set; then according to changes in concentrations of a main insulating gas to be used in the equipment and the mixed decomposed gas composition before and after adsorption, a third suitable adsorbent for the mixed decomposed gas composition is screened out and selected to establish a third adsorbent type set; the main insulating gas is a gas component other than the mixed decomposed gas composition in a mixed atmosphere inside the equipment;
   (5) mapping a relationship between the decomposed gas type set and the third adsorbent type set and based on the mapping relationship, selecting a combination of adsorbents suitable to adsorb the mixed decomposed gas composition; the mapping relationship is specifically a correspondence between an operating condition of the equipment, the mixed decomposed gas composition produced under said operating condition of the equipment and the combination of adsorbents suitable to adsorb the mixed decomposed gas composition produced under said operating condition of the equipment; and
   (6) if there is no corresponding between the combination of adsorbents and the mixed decomposed gas composition under a certain operating condition of the equipment according to the mapping relationship, based on a molecular dynamics theory, constructing a structure of a simulated adsorbent combining the results of the three adsorption experiment screenings in steps (2), (3), and (4), and selecting a combination of adsorbents suitable for the structure of the simulated adsorbent.

2. The screening method for selecting an adsorbent for use in environment-friendly gas-insulated equipment according to claim 1, in the step (1), the decomposed gas type set is denoted as $G_i$, wherein each element in the decomposed gas type set $G_i$ is denoted as $g_{im}$ which represents the m-th type of decomposed gas under the i-th type of operating condition of the equipment;

the original adsorbent type set is denoted as X, wherein each element in the original adsorbent type set X is denoted as $x_l$ which represents the l-th type of adsorbent; where i, m, and l are all integers greater than or equal to 1, and l≥m.

3. The screening method for selecting an adsorbent for use in environment-friendly gas-insulated equipment according to claim 2, in the step (2), each of the adsorbents in the original adsorbent type set is selected to adsorb the standard gas corresponding to each of the decomposed gases in the decomposed gas type set; if the ratio of the change in mass of the adsorbent after the adsorption to the mass of the adsorbent before the adsorption is greater than or equal to 10%, determining that the adsorbent is suitable for adsorbing a certain standard gas, and incorporating the adsorbent as the first suitable adsorbent into the first adsorbent type set.

4. The screening method for selecting an adsorbent for use in environment-friendly gas-insulated equipment according to claim 3, in the step (3), each of the first adsorbent in the first adsorbent type set is selected to adsorb the standard gas corresponding to each of the decomposed gases in the decomposed gas type set; if the ratio of the change in concentration of the standard gas after the adsorption to the concentration of the standard gas before the adsorption is greater than or equal to 50%, determining that adsorbent is suitable for adsorbing a certain standard gas, and incorporating the adsorbent as the second suitable adsorbent into the second adsorbent type set.

5. The screening method for selecting an adsorbent for use in environment-friendly gas-insulated equipment according to claim 4, in the step (4), each of the second adsorbents in the second adsorbent type set is selected to adsorb the mixed decomposed gas composition; if the ratio of the change in concentration of the main insulating gas after the adsorption to the concentration of the main insulating gas before the adsorption is greater than or equal to 99.9%, and the ratio of the change in concentration of the mixed decomposed gas composition after the adsorption to the concentration of the mixed decomposition gas before adsorption is greater than or equal to 50%, determining that the adsorbent is suitable for adsorbing the mixed decomposed gas composition, and incorporating the adsorbent as the third adsorbent into the third adsorbent type set.

6. The screening method for selecting an adsorbent for use in environment-friendly gas-insulated equipment according to claim 1, in the step (6), the steps of constructing a structure of a simulated adsorbent based on molecular dynamics theory are as follows:

Van der Waals surface of each of the decomposed gases and porous structure of each of the adsorbent are obtained, an adsorbent structure with a larger pore size than the van der Waals surface of the decomposed gas is screened out and incorporated into a primary selection set of adsorbent structures;

Materials Studio software is used to conduct simulation to build the structure of the decomposed gas used in the primary selection set of adsorbent structure, a material structure and a structure of the decomposed gas are optimized respectively, and adsorption energy and adsorption capacity of different adsorbents in the primary selection set of adsorbent structures with respect to a single decomposed gas are obtained;

the obtained adsorption energy is compared with a preset adsorption energy threshold, and the obtained adsorption capacity is compared with a preset adsorption capacity threshold, then if the absolute value of the obtained adsorption energy is greater than or equal to the preset adsorption energy threshold, and the adsorption capacity is greater than or equal to the preset adsorption capacity threshold, the adsorbent is incorporated into a secondary selection set of adsorbent structures;

adsorption energy and adsorption capacity of different adsorbents in the secondary selection set of adsorbent structures with respect to the mixed decomposed gas composition are obtained based on a mixed decomposed gas composition adsorption model, and the corresponding relationship between the adsorbent structure and the adsorption energy and adsorption capacity of the mixed decomposed gas composition is established;

based on the corresponding relationship, combined with the results of the pre-experiment experiment screening, the standard gas adsorption experiment screening, and the mixed gas adsorption experiment screening, and according to adsorption energy and adsorption capacity requirements of the mixed decomposed gas composition, the adsorbents that match the structure are screened out and selected.

7. The screening method for selecting an adsorbent for use in environment-friendly gas-insulated equipment according to claim 1, wherein the adsorption experiment screenings in the steps (2), (3), and (4) are all performed by an adsorption device, and the adsorption device comprising an intake pipe, an adapter, a plurality of gas chambers, and a plurality of guide pipes;

the adapter is a hollow polygonal prism-shaped structure, the top of the adapter is communicated with the intake pipe, and the side surface of the adapter is communicated with a plurality of guide pipes, one end of each of the guide pipes away from the adapter is communicated with a respective gas chamber, and the gas chamber has a closed cavity for accommodating a gas and an adsorbent to be measured;

each of the guide pipe is provided with an inlet valve for controlling the flow rate of the gas to be measured entering the gas chamber.

* * * * *